(12) United States Patent
Brand

(10) Patent No.: US 8,697,784 B2
(45) Date of Patent: Apr. 15, 2014

(54) PERMANENT ANTISTATIC ADDITIVE COMPOSITION

(75) Inventor: Fabien Jean Brand, Huningue (FR)

(73) Assignee: BASF SE, Ludwigshafen (DE)

( * ) Notice: Subject to any disclaimer, the term of this patent is extended or adjusted under 35 U.S.C. 154(b) by 201 days.

(21) Appl. No.: 13/378,223

(22) PCT Filed: Jun. 11, 2010

(86) PCT No.: PCT/EP2010/058209
§ 371 (c)(1),
(2), (4) Date: Dec. 14, 2011

(87) PCT Pub. No.: WO2010/145995
PCT Pub. Date: Dec. 23, 2010

(65) Prior Publication Data
US 2012/0088867 A1 Apr. 12, 2012

(30) Foreign Application Priority Data
Jun. 15, 2009 (EP) .................................... 09162683

(51) Int. Cl.
*C09K 3/16* (2006.01)
*C08K 5/42* (2006.01)

(52) U.S. Cl.
USPC ............. 524/94; 524/367; 524/376; 524/378; 524/165; 524/158; 524/166; 524/236; 524/323; 524/111; 524/117; 524/120; 524/151

(58) Field of Classification Search
USPC ........... 524/94, 367, 376, 378, 165, 158, 166, 524/236, 323, 111, 117, 120, 151
See application file for complete search history.

(56) References Cited

U.S. PATENT DOCUMENTS

| 3,591,563 A | 7/1971 | Barie et al. |
| 3,819,656 A | 6/1974 | Barie et al. |
| 4,848,566 A | 7/1989 | Havens et al. |
| 5,001,015 A | 3/1991 | Havens |
| 5,955,165 A | 9/1999 | Zamora et al. |
| 2003/0183810 A1* | 10/2003 | Fujihana et al. ............... 252/500 |
| 2004/0156933 A1 | 8/2004 | McNamara et al. |
| 2008/0027182 A1 | 1/2008 | McNamara et al. |

FOREIGN PATENT DOCUMENTS

| CN | 1427873 A | 7/2003 |
| EP | 0 313 066 | 4/1989 |
| JP | 03-002251 | 1/1991 |
| JP | 06-184391 | 7/1994 |
| JP | 9-12815 | 1/1997 |
| WO | 98 47773 | 10/1998 |
| WO | WO 01/79354 A1 | 10/2001 |
| WO | 02 42530 | 5/2002 |
| WO | 02 092668 | 11/2002 |
| WO | 2009 043957 | 4/2009 |

OTHER PUBLICATIONS

International Search Report Issued Aug. 11, 2010 in PCT/EP10/058209 Filed Jun. 11, 2010.
European Search Report Issued Sep. 2, 2009 in European Patent Application No. 09162683.8 Filed Jun. 15, 2009.
Office Action issued on Oct. 12, 2013 with English Translation.

* cited by examiner

*Primary Examiner* — Robert D. Harlan
(74) *Attorney, Agent, or Firm* — Oblon, Spivak, McClelland, Maier & Neustadt, L.L.P.

(57) ABSTRACT

The invention relates to antistatic polymer compositions comprising a polymer substrate, a polyalkyleneethoxylate with a specific molecular weight and a salt. Further aspects are a process for preparing an antistatic polymer and the use of such a polyalkyleneethoxylate as antistatic agent in polymers, preferably together with a salt.

20 Claims, No Drawings

PERMANENT ANTISTATIC ADDITIVE COMPOSITION

The invention relates to antistatic polymer compositions comprising a polymer substrate, a polyalkyleneethoxylate with a specific molecular weight and a salt. Further aspects are a process for preparing an antistatic polymer and the use of such a polyalkyleneethoxylate as antistatic agent in polymers, preferably together with a salt.

Polymers are subject to a strong electrostatic charge which when applied, can be discharged only slowly due to low electrical conductivity. Rapid discharging is desirable for example for reasons of safety and aesthetics. Adverse effects of static charge build-up include the soiling of polymer surfaces, electrical shocks to persons touching polymers, disruption of production caused by the adhesion of film webs, destruction of electronic components, lump formation in polymer powders, and sparking followed by ignition, which may result in serious explosions.

It is known to limit static charging by the addition of additives that improve surface conductivity, but such substances have the disadvantage of being ineffective in practice when atmospheric humidity is low. It is therefore better to use additives that are effective at low atmospheric humidity, which can usually be achieved by increasing the volume conductivity. The known substances for increasing volume conductivity, for example carbon black or metal powder, however, alter the mechanical properties of the polymers and cannot be used for transparent polymers. In addition, the antistatic additive should not contribute to any discoloration of the polymer, even under thermal stress.

Further details relating to antistatic additives and the mechanism of static charging may be found, for example, in the "Plastics Additives Handbook", editors R. Gaechter and H. Mueller, Hanser Publishers, 4th edition, 1993, pages 749-773.

In view of the above-mentioned limitations of the known methods of rendering polymers antistatic, there continues to be a need for an antistatically active, ecologically unobjectionable additive system that is effective at low atmospheric humidity, which system is simple to produce, can easily be incorporated into or mixed with the polymer, retains over a long period the antistatic effect of the polymer achieved and, without any notable restriction, can be used in small amounts in all commercially available polymers. Surprisingly it has been found that polyalkyleneethoxylates with a specific molecular weight together with a salt are highly compatible with polymers, exhibit essentially no loss during thermal exposure, do not adversely affect the color of the polymer articles and lead to a permanent antistatic effect even under dry atmospheric conditions.

One aspect of the invention is a composition comprising
a) a thermoplastic or elastomeric polymeric substrate,
b) an antistatic polymer of formula (I) $Q_1$-$Q_2$ (I) with a molecular weight of at least 400 wherein
$Q_1$ is $C_{20}$-$C_{100}$alkyl, $C_{20}$-$C_{100}$alkenyl or $C_5$-$C_{12}$cycloalkyl which is substituted by 1 to 5 $C_1$-$C_{100}$alkyl groups;
Q2 is a group of formula (II)

(II)

wherein
$R_1$ is H or $CH_3$;
n is a number from 2 to 6;
t is a number from 1 to 200;
* is the point of attachment and
c) an inorganic or organic salt.
For example $Q_1$ is $C_{20}$-$C_{100}$alkyl, preferably $C_{25}$-$C_{60}$alkyl.
For instance $Q_2$ is a group of formula (IIa)

(IIa)

wherein
$R_1$ is H or $CH_3$ and
t is a number from 1 to 50.
Preferably t is a number from 2 to 20.

The molecular weight of the compounds of formula (I) is preferably greater 500.

For example the molecular weight of the compounds of formula (I) is from 400 to 2000, preferably from 500 to 1600.

The compounds of formula (I) are known and in the majority commercially available, for example, from Baker Petrolite Inc. under the tradename Unithox™ Ethoxylate.

For example the inorganic or organic salt is selected from the group consisting of $LiClO_4$, $LiCF_3SO_3$, $NaClO_4$, $LiBF_4$, $NaBF_4$, $KBF_4$, $NaCF_3SO_3$, $KClO_4$, $KPF_6$, $KCF_3SO_3$, $KC_4F_9SO_3$, $Ca(ClO_4)_2$, $Ca(PF_6)_2$, $Mg(ClO_4)_2$, $Mg(CF_3SO_3)_2$, $Zn(ClO_4)_2$, $Zn(PF_6)_2$, $Ca(CF_3SO_3)_2$, the Na or K salt of phosphoric acid, of a $C_1$-$C_{18}$carboxylic acid, of an aromatic or aliphatic sulfonic acid.

As inorganic salts there are preferred $NaClO_4$, $Zn(ClO_4)_2$ and $NaBF_4$.

As organic salts there are preferred the $Na^+$ or $K^{30}$ salts of $CH_3$-$SO_3^-$, $CF_3SO_3^-$ or

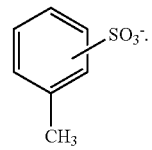

Examples of thermoplastic or elastomeric polymers are listed below.
1. Polymers of mono- and di-olefins, for example polypropylene, polyisobutylene, poly-butene-1, poly-4-methylpentene-1, polyisoprene or polybutadiene and also polymerisates of cyclo-olefins, such as, for example, of cyclopentene or norbornene; and also polyethylene (which may optionally be cross-linked), for example high density polyethylene (HDPE), low density polyethylene (LDPE), linear low density polyethylene (LLDPE), branched low density polyethylene (BLDPE).

Polyolefins, that is to say polymers of mono-olefins, as mentioned by way of example in the preceding paragraph, especially polyethylene and polypropylene, can be prepared by various processes, especially by the following methods:
a) radically (usually at high pressure and high temperature);
b) by means of catalysts, the catalyst usually containing one or more metals of group IVb, Vb, VIb or VIII. Those metals generally have one or more ligands, such as oxides, halides, alcoholates, esters, ethers, amines, alkyls, alkenyls and/or aryls, which may be either p- or s-coordinated. Those metal complexes may be free or fixed to carriers, such as, for example, to activated magnesium chloride, titanium(III) chloride, aluminium oxide or silicon oxide. Those catalysts may be soluble or insoluble in the polymerisation medium. The catalysts can be active as such in the polymerisation or further activators may be used, such as, for example, metal alkyls, metal hydrides, metal alkyl halides, metal alkyl oxides or metal alkyl oxanes, the metals being elements of group(s) Ia, IIa and/or IIIa. The activators may be modified, for example, with further ester, ether, amine or silyl ether groups. Those catalyst systems are usually known as Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of mono- and di-olefins with one another or with other vinyl monomers, such as, for example, ethylene/propylene copolymers, linear low density polyethylene (LLDPE) and mixtures thereof with low density polyethylene (LDPE), propylene/butene-1 copolymers, propylene/isobutylene copolymers, ethylene/butene-1 copolymers, ethylene/hexene copolymers, ethylene/methylpentene copolymers, ethylene/heptene copolymers, ethylene/-octene copolymers, propylene/butadiene copolymers, isobutylene/isoprene copolymers, ethylene/alkyl acrylate copolymers, ethylene/alkyl methacrylate copolymers, ethylene/vinyl acetate copolymers and copolymers thereof with carbon monoxide, or ethylene/acrylic acid copolymers and salts thereof (ionomers), and also terpolymers of ethylene with propylene and a diene, such as hexadiene, dicyclopentadiene or ethylidenenorbornene; and also mixtures of such copolymers with one another or with polymers mentioned under 1), for example polypropylene-ethylene/propylene copolymers, LDPE-ethylene/vinyl acetate copolymers, LDPE-ethylene/acrylic acid copolymers, LLDPE-ethylene/vinyl acetate copolymers, LLDPE-ethylene/acrylic acid copolymers and alternately or randomly structured polyalkylene-carbon monoxide copolymers and mixtures thereof with other polymers, such as, for example, polyamides.

4. Hydrocarbon resins (for example $C_5$-$C_9$) including hydrogenated modifications thereof (for example tackifier resins) and mixtures of polyalkylenes and starch.

5. Polystyrene, poly(p-methylstyrene), poly($\alpha$-methylstyrene).

6. Copolymers of styrene or $\alpha$-methylstyrene with dienes or acrylic derivatives, such as, for example, styrene/butadiene, styrene/acrylonitrile, styrene/alkyl methacrylate, styrene/-butadiene/alkyl acrylate and methacrylate, styrene/maleic acid anhydride, styrene/-acrylonitrile/methyl acrylate; high-impact-strength mixtures consisting of styrene copolymers and another polymer, such as, for example, a polyacrylate, a diene polymer or an ethylene/-propylene/diene terpolymer; and also block copolymers of styrene, such as, for example, styrene/butadiene/styrene, styrene/isoprene/styrene, styrene/ethylene-butylene/styrene or styrene/ethylene-propylene/styrene.

7. Graft copolymers of styrene or $\alpha$-methylstyrene, such as, for example, styrene on poly-butadiene, styrene on polybutadiene/styrene or polybutadiene/acrylonitrile copolymers, styrene and acrylonitrile (or methacrylonitrile) on polybutadiene; styrene, acrylonitrile and methyl methacrylate on polybutadiene; styrene and maleic acid anhydride on polybutadiene; styrene, acrylonitrile and maleic acid anhydride or maleic acid imide on polybutadiene; styrene and maleic acid imide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned under 6), such as those known, for example, as so-called ABS, MBS, ASA or AES polymers.

8. Halogen-containing polymers, such as, for example, polychloroprene, chlorocaoutchouc, chlorinated or chlorosulfonated polyethylene, copolymers of ethylene and chlorinated ethylene, epichlorohydrin homo- and co-polymers, especially polymers of halogen-containing vinyl compounds, such as, for example, polyvinyl chloride, polyvinylidene chloride, polyvinyl fluoride, polyvinylidene fluoride; and copolymers thereof, such as vinyl chloride/vinylidene chloride, vinyl chloride/vinyl acetate or vinylidene chloride/vinyl acetate.

9. Polymers derived from $\alpha,\beta$-unsaturated acids and derivatives thereof, such as polyacrylates and polymethacrylates, or polymethyl methacrylates, polyacrylamides and polyacrylonitriles impact-resistant-modified with butyl acrylate.

10. Copolymers of the monomers mentioned under 9) with one another or with other unsaturated monomers, such as, for example, acrylonitrile/butadiene copolymers, acrylonitrile/alkyl acrylate copolymers, acrylonitrile/alkoxyalkyl acrylate copolymers, acrylonitrile/-vinyl halide copolymers or acrylonitrile/alkyl methacrylate/butadiene terpolymers.

11. Polymers derived from unsaturated alcohols and amines or their acyl derivatives or acetals, such as polyvinyl alcohol, polyvinyl acetate, stearate, benzoate or maleate, polyvinylbutyral, polyallyl phthalate, polyallylmelamine; and the copolymers thereof with olefins mentioned in Point 1.

12. Homo- and co-polymers of cyclic ethers, such as polyalkylene glycols, polyethylene oxide, polypropylene oxide or copolymers thereof with bisglycidyl ethers.

13. Polyacetals, such as polyoxymethylene, and also those polyoxymethylenes which contain comonomers such as, for example, ethylene oxide; polyacetals that are modified with thermoplastic polyurethanes, acrylates or MBS.

14. Polyphenylene oxides and sulfides and mixtures thereof with styrene polymers or polyamides.

15. Polyurethanes derived from polyethers, polyesters and polybutadienes having terminal hydroxy groups on the one hand and aliphatic or aromatic polyisocyanates on the other hand, and their initial products.

16. Polyamides and copolyamides derived from diamines and dicarboxylic acids and/or from aminocarboxylic acids or the corresponding lactams, such as polyamide 4, polyamide 6, polyamide 6,6, 6,10, 6,9, 6,12, 4,6, 12,12, polyamide 11, polyamide 12, aromatic polyamides derived from m-xylene, diamine and adipic acid; polyamides prepared from hexamethylenediamine and iso- and/or tere-phthalic acid and optionally an elastomer as modifier, for example poly-2,4,4-trimethylhexamethyleneterephthalamide or poly-m-phenylene-isophthalamide. Block copolymers of the above-mentioned polyamides with polyolefins, olefin copolymers, ionomers or chemically bonded or grafted elastomers; or with polyethers, such as, for example, with polyethylene glycol, polypropylene glycol or polytetramethylene glycol. Also polyamides or copolyamides modified with EPDM or ABS; and polyamides condensed during processing ("RIM polyamide systems").

17. Polyureas, polyimides, polyamide imides and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, and also block polyether esters derived from polyethers with hydroxy terminal groups; and also polyesters modified with polycarbonates or MBS.
19. Polycarbonates and polyester carbonates.
20. Polysulfones, polyether sulfones and polyether ketones.
21. Natural polymers, such as natural rubber, or polymer-homologously chemically modified derivatives of cellulose, such as cellulose acetates, propionates and butyrates, and the cellulose ethers, such as methyl cellulose.
22. Mixtures (polyblends) of the afore-mentioned polymers, such as, for example, PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6,6 and copolymers, PA/HDPE, PA/PP, PA/PPO.

Preferably, the thermoplastic or elastomeric polymeric substrate is a polyolefin, a polystyrene, a copolymer of acrylonitrile/butadiene/styrene (ABS), a polymer of α,β-unsaturated acids, a halogen-containing polymer, a homo- or copolymer of cyclic ethers, a polymer of unsaturated alcohols and amines, a polyacetal, a polyphenylene oxide, a polyurethane, a polyamide, a polyester, a polyurea, a polycarbonate, a polysulfone or natural rubber.

The thermoplastic or elastomeric polymeric substrate is especially a polyolefin, a polystyrene, an acrylonitrile/butadiene/styrene (ABS) copolymer, a polymer of α,β-unsaturated acids, a halogen-containing polymer or a homo- or copolymer of cyclic ethers.

The thermoplastic or elastomeric polymeric substrate is more especially polyvinyl chloride (PVC), polystyrene, polyethylene in its various modifications, or polypropylene.

For example the antistatic polymer of formula (I) is present in an amount of from 0.1% to 30% by weight, based on the weight of the thermoplastic or elastomeric polymeric substrate.

For instance the inorganic or organic salt is is present in an amount of from 0.1% to 10% by weight, based on the weight of the thermoplastic or elastomeric polymeric substrate.

The weight ratio of the antistatic polymer of formula (I) to the inorganic or organic salt is from 200:1 to 20:1.

In a specific embodiment the composition comprises additionally an additive selected from the group consisting of a UV absorber, a sterically hindered amine, a phenolic antioxidant, a phosphite or phosphonite and a benzofuranone or indolinone.

Examples for the aforementioned additives are given below.

1. Antioxidants
1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.
1.2. Alkylthiomethylphenols, for example 2,4-dioctylthiomethyl-6-tert-butylphenol, 2,4-dioctyl-thiomethyl-6-methylphenol, 2,4-dioctylthiomethyl-6-ethylphenol, 2,6-didodecylthiomethyl-4-nonylphenol.
1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.
1.4. Tocopherols, for example α-tocopherol, β-tocopherol, γ-tocopherol, δ-tocopherol and mixtures thereof (vitamin E).
1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.
1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy2-methylphenyl)-4-n-dodecylmercaptobutane, 1,1,5,5-tetra-(5-tert-butyl-4-hydroxy-2-methylphenyl)pentane.
1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4- hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzylmercaptoacetate.
1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl) malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.
1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.
1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxy-phenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N, N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N, N'- bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenyl-propionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicy-clohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenyl-amine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyl-aminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylamino-methylphenol, 2,4'-diaminodiphenylmethane, 4,4'-diaminodiphenylmethane, N,N,N',N'-tetra-methyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazine, N,N,N',N'-tetraphenyl-1,4-diaminobut-2-ene.

2. UV Absorbers and Light Stabilisizers 2.1. 2-(2'-Hydroxyphenyl)benzotriazoles, for example 2-(2'-hydroxy-5'-methylphenyl)-benzo-triazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy- 5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

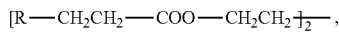

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,62 -diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis (2,2,6,6-tetramethyl-4-piperidyl)hexamethylenediamine and 4-tert-octylamino-2,6-di-chloro-1,3,5-triazine, tris(2,2,6,6-tetramethyl-4-piperidyl)nitrilotriacetate, tetrakis(2,2,6,6-tetra-methyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyl-oxy-2,2,6,6-tetramethylpiperidyl)sebacate, bis(1-octyloxy-2,2,6,6-tetramethylpiperidyl)succinate, linear or cyclic condensates of N,N'-bis (2,2,6,6-tetramethyl-4-piperidyl)hexamethylene-diamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro [4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro-[4,5]decane, a reaction product of 7,7,9,9-tetramethyl-2-cycloundecyl-1-oxa-3,8-diaza-4-oxo-spiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)-hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl) oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl)ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl) oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyl-oxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5- triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,4-dicumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12 H-dibenz[d,g]-1,3,2- dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos®168, Ciba Specialty Chemicals Inc.), tris(nonylphenyl) phosphite,

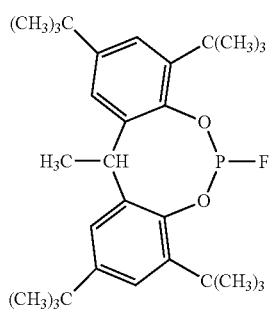
(A)

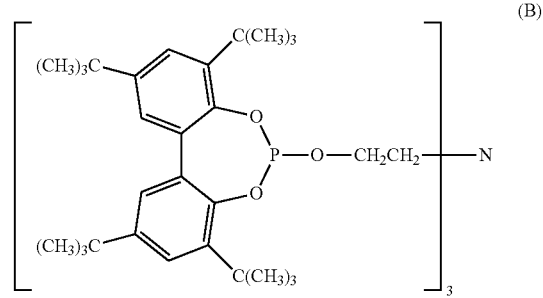
(B)

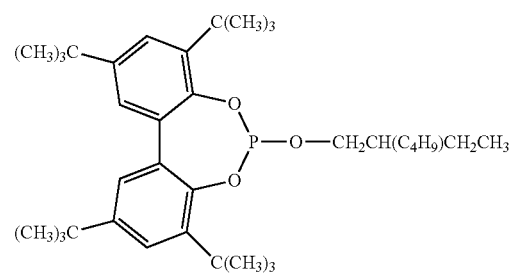
(C)

(D)

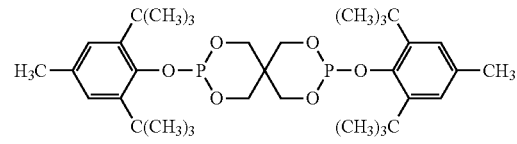
(E)

(F)

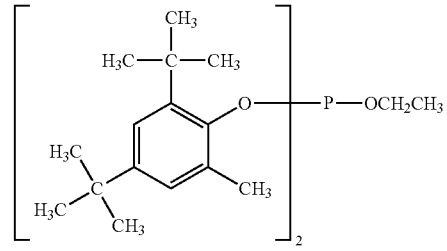
(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-hepta-decylnitrone, N-octadecyl-alpha-hexadecylnitrone, nitrone derived from N,N-dialkylhydroxylamine derived from hydrogenated tallow amine.
7. Thiosynergists, for example dilauryl thiodipropionate, dimistryl thiodipropionate, distearyl thiodipropionate or distearyl disulfide.
8. Peroxide scavengers, for example esters of β-thiodipropionic acid, for example the lauryl, stearyl, myristyl or tridecyl esters, mercaptobenzimidazole or the zinc salt of 2-mercapto-benzimidazole, zinc dibutyldithiocarbamate, dioctadecyl disulfide, pentaerythritol tetrakis(β-dodecylmercapto)propionate.
9. Polyamide stabilizers, for example copper salts in combination with iodides and/or phosphorus compounds and salts of divalent manganese.
10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.
11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.
12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.
13. Other additives, for example plasticisers, lubricants, emulsifiers, pigments, rheology additives, catalysts, flow-control agents, optical brighteners, flameproofing agents, antistatic agents and blowing agents.
14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxy-ethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-di-methylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctyl-benzofuran-2-one.

These further additives are usually added in an amount of from 0.1 to 5% by weight, based on the weight of the thermoplastic or elastomeric polymeric substrate.

A further aspect of the invention is a process for preparing an antistatic thermoplastic or elastomeric polymeric article comprising incorporating a composition as described above into a thermoplastic or elastomeric polymeric substrate.

The preparation may be carried out in a manner known per se by mixing the said components and, if desired, further additives with the polymer using devices known per se, such as calenders, mixers, kneaders, extruders and the like. The additives may be added individually or in admixture with one another. It is also possible to use so-called master batches.

An antistatic thermoplastic polymer according to the present invention can be made into the desired form in known manner. Such processes include, for example, grinding, calendering, extruding, injection-moulding, sintering, compression/sintering or spinning, also extrusion blow-moulding, or processing according to the plastisol method. The antistatic thermoplastic polymer may also be processed to form foamed materials.

Also within the scope of the present invention is the use of a polymer of formula (I)

Q1-Q2 (I) with a molecular weight of at least 400 wherein Q1 is $C_{20}$-$C_{100}$alkyl, $C_{20}$-$C_{100}$alkenyl or $C_5$-$C_{12}$cycloalkyl which is substituted by 1 to 5 $C_1$-$C_{100}$alkyl groups;

$Q_2$ is a group of formula (II)

(II)

wherein
$R_1$ is H or $CH_3$;
n is a number from 2 to 6;
t is a number from 1 to 200; and
* is the point of attachment
as an antistatic additive for thermoplastic or elastomeric polymers.

Preferably an organic or inorganic salt is used additionally.

The definitions and preferences given above apply equally for all aspects of the invention.

The instant invention may be advantageously used for anti-dust application in packaging. The objective is to achieve a minimized dust attraction, prolonged visual appeal for rigid packaging personal care (Hair Care, Bath & Shower, Skin Care, Deo) and home care (detergent, household cleaning) or rigid packaging for dairy food (milk, butter, margarine, yoghurt and the like). Suitable substrate polymers for these applications are: HDPE, PP, PS. Typical processing steps are, for example: extrusion blow molding (bottles), injection (deo), sheet (thermoforming for dairy products). The packaging structures may be monolayer or multilayer.

Also of interest are antistatic applications for electronics packaging and transportation, industrial packaging or ESD* (Electrostatic Discharge) protected area equipment. The objective is to protect charge sensitive devices from ESD-events (electronics), to minimize the risk of explosion or ignition of flammable goods, to enhance long-term performance and reliability. Typical substrate polymers are PP and PS.

The following examples illustrate the invention.

Materials used: Unithox 350(compound 101), Unithox 420 (compound 102), Unithox 520(compound 103), Unithox 550(compound 104), Unithox 720(compound 105) and Unithox 750(compound 106).

Salts:
NaTS is sodium toluenesulfonate, NaMes is sodium methanesulfonate, AcOK is the potassium salt of acetic acid.
Polystyrene (PS), Styron 484 natural polystyrene from Dow Inc.
Polypropylene (PP), HC 115 MO from Borealis Inc.
High density polyethylene (HDPE), BL 2571 from Borealis Inc.
Low density polyethylene (LDPE), Riblene FF 29 from Polimeri Europe Inc.
Measurements
Contact Angle:

The contact angles of the produced tapes are measured with a Dataphysics OCA 30 contact angle device, using the sessile drop method and water as measuring liquid.

Surface Resistivity:

The surface resistivity values SR [Ohms/square] are measured with a sprung-tongue electrode in analogy to DIN 53482, at a voltage of 500V, at 22° C., at defined relative humidity (RH) of the air.

EXAMPLE 1

Processing of PS Extrusion Tapes

In order to evaluate their processability in PS and surface properties, the compounds of formula I are incorporated in polystyrene extrusion tapes according to the following procedure:

The polystyrene powder Styron 484 Natural Polystyrene and the compound of formula I are dried in a vacuum oven for eight hours at 80° C. and 40° C. respectively. Appropriate amounts of the compounds of formula I are added to the dried polystyrene powder to obtain formulations containing up to 20% by weight of the compounds. The formulations are mixed in a turbo mixer and extruded in a twin-screw extruder (MiniLab extruder from Thermo Electron Corporation) equipped with a flat die. In this way polystyrene tapes are produced with a width of 5 mm and a thickness of around 0.5 mm. The processing temperature is around 200° C. The results are summarized in the following Table 1.

Example 1a is a comparative example. Examples 1b to 1m are examples of the present invention describing formulations including the 3 components (a), (b) and (c). They show the benefit of various salts and in most cases the good processability and visual compatibility of the compounds of formula I.

TABLE 1

Results for PS extrusion tapes

| Example | Additive | Contact angle [°] | SR [Ohm/sq] @ 50% RH | SR [Ohm/sq] @ 15% RH | Processability/ Compatibility |
|---|---|---|---|---|---|
| 1a | None | 103 | 1.27E+15 | 2.36E+14 | — |
| 1b | 10% 105:NaTS 98:2 | 101 | 3.66E+14 | | Good |
| 1c | 20% 105:NaTS 98:2 | 94 | 7.14E+11 | 1.03E+13 | Good |
| 1d | 10% 106:NaTS 98:2 | 92 | 5.71E+13 | | Good |
| 1e | 20% 106:NaTS 98:2 | 31 | 2.23E+09 | 1.33E+10 | Weak |
| 1f | 5% 105:AcOK 98:2 | 102 | 2.07E+14 | | Good |
| 1g | 10% 105:AcOK 98:2 | 100 | 3.32E+11 | | Good |
| 1h | 5% 106:AcOK 98:2 | 96 | 9.64E+13 | | Good |
| 1i | 10% 106:AcOK 98:2 | 88 | 2.26E+13 | | Good |
| 1j | 5% 105:NaMes 98:2 | 97 | 8.21E+13 | | Good |
| 1k | 10% 105:NaMes 98:2 | 101 | 2.45E+11 | 2.38E+12 | Weak |
| 1l | 5% 106:NaMes 98:2 | 98 | 2.47E+14 | | Good |
| 1m | 10% 106:NaMes 98:2 | 91 | 5.77E+13 | | Good |

EXAMPLE 2

Processing of PP Extrusion Tapes

In order to evaluate their processability in PP and surface properties, the compounds of formula I are incorporated in polypropylene extrusion tapes according to the following procedure:

The polypropylene powder HC115MO and the compounds of formula I are dried in a vacuum oven for eight hours at 80° C. and 40° C. respectively. Appropriate amounts of compounds of the formula I are added to the dried polypropylene powder to obtain formulations containing up to 20% by weight of the compounds. The formulations are mixed in a turbo mixer and extruded in a twin-screw extruder (MiniLab extruder from Thermo Electron Corporation) equipped with a flat die. In this way polypropylene tapes are produced with a width of 5 mm and a thickness of around 0.5 mm. The processing temperature is around 220° C. The results are summarized in Table 2.

Example 2a is a comparative example. Examples 2b to 2m are examples of the present invention describing formulations including the 3 components (a), (b) and (c).

TABLE 2

Results for PP extrusion tapes

| Example | Additive | Contact angle [°] | SR [Ohm/sq] @ 50% RH | SR [Ohm/sq] @ 15% RH | Processability/ Compatibility |
|---|---|---|---|---|---|
| 2a | None | 105 | 2.99E+14 | 1.73E+14 | — |
| 2b | 10% 105:NaTS 98:2 | 75 | 2.69E+12 | 1.17E+13 | Good |

TABLE 2-continued

Results for PP extrusion tapes

| Example | Additive | Contact angle [°] | SR [Ohm/sq] @ 50% RH | SR [Ohm/sq] @ 15% RH | Processability/ Compatibility |
|---|---|---|---|---|---|
| 2c | 20% 105:NaTS 98:2 | 64 | | | Good |
| 2d | 10% 106:NaTS 98:2 | 97 | 2.20E+11 | 1.05E+12 | Weak |
| 2e | 20% 106:NaTS 98:2 | 91 | | | Weak |
| 2f | 5% 105:AcOK 98:2 | 56 | 1.63E+11 | 7.29E+11 | Good |
| 2g | 10% 105:AcOK 98:2 | 47 | 8.91E+10 | 3.54E+12 | Good |
| 2h | 5% 106:AcOK 98:2 | 104 | 1.22E+13 | | Good |
| 2i | 10% 106:AcOK 98:2 | 97 | 1.08E+13 | | Weak |
| 2j | 5% 105:NaMes 98:2 | 50 | 4.07E+11 | 1.03E+13 | Good |
| 2k | 10% 105:NaMes 98:2 | 44 | 9.51E+10 | 1.96E+12 | Good |
| 2l | 5% 106:NaMes 98:2 | 100 | 4.59E+13 | | Good |
| 2m | 10% 106:NaMes 98:2 | 62 | 2.31E+11 | 1.68E+12 | Weak |

EXAMPLE 3

Processing of HDPE Extrusion Tapes

In order to evaluate their processability in HDPE and surface properties, the compounds of formula I are incorporated in polyethylene extrusion tapes according to the following procedure:

The high density polyethylene powder BL2571 and the compounds of formula I are dried in a vacuum oven for eight hours at 80° C. and 40° C. respectively. Appropriate amounts of the compounds of formula I are added to the dried polyethylene powder to obtain formulations containing up to 20% by weight of the compounds. The formulations are mixed in a turbo mixer and extruded in a twin-screw extruder (MiniLab extruder from Thermo Electron Corporation) equipped with a flat die. In this way polyethylene tapes are produced with a width of 5 mm and a thickness of around 0.5 mm. The processing temperature is around 220° C. The results are summarized in Table 3.

Example 3a is a comparative example. Examples 3b to 3e are examples of the present invention describing formulations including the 3 components (a), (b) and (c). The best examples are 3b and 3c.

EXAMPLE 4

Processing of PS Injection Molded Plaques

In order to evaluate their processability in PS and surface properties, the new compounds of the formula I are incorporated in polystyrene injection molded plaques according to the following procedure:

The polystyrene powder Styron 484 Natural Polystyrene and the compounds of formula I are dried in a vacuum oven for eight hours at 80° C. and 40° C. respectively. Appropriate amounts of the compounds of formula I are added to the dried polystyrene powder to obtain formulations containing up to 20% by weight of the compounds. The formulations are mixed in a turbo mixer and compounded to pellets in a twin-screw extruder (MiniLab or Polylab from Thermo Electron Corp.) and further injection molded to larger plaques of a width of 85 mm, length of 90 mm and thickness of 2 mm using an injection molding machine (Arbug 320S). The processing temperature is around 200° C. The results are summarized in Table 4.

Example 4a and 4d are comparative examples. Examples 4b and 4c are examples of the present invention describing formulations comprising the 3 components (a), (b) and (c).

TABLE 3

Results for HDPE extrusion tapes

| Exam. | Additive | Contact angle [°] | SR [Ohm/sq] @ 50% RH | SR [Ohm/sq] @ 30% RH | SR [Ohm/sq] @ 15% RH | Processability/ Compatibility |
|---|---|---|---|---|---|---|
| 3a | None | 88 | 3.32E+13 | 6.16E+13 | 2.11E+14 | — |
| 3b | 10% 105:NaTS 98:2 | 84 | 1.26E+10 | 2.20E+11 | 2.34E+12 | Good |
| 3c | 20% 105:NaTS 98:2 | 68 | 2.04E+10 | 2.11E+11 | 5.36E+11 | Good |
| 3d | 10% 106:NaTS 98:2 | — | 4.27E+08 | 6.42E+09 | 3.76E+10 | Weak |
| 3e | 20% 106:NaTS 98:2 | — | 5.88E+08 | 1.93E+09 | 5.39E+09 | Weak |

TABLE 4

Results for PS injection molded large plaques

| Example | Additive | Contact angle [°] | SR [Ohm/sq] @ 50% RH | SR [Ohm/sq] @ 15% RH | Processability/ Compatibility |
|---|---|---|---|---|---|
| 4a | None | 97 | 2.14E+15 | 2.78E+15 | — |
| 4b | 5% 102:AcOK 98:2 | 87 | 5.56E+13 | | Good |
| 4c | 10% 102:AcOK 98:2 | 81 | 4.39E+12 | 1.70E+13 | Good |
| 4d comp. | 10% 102 without salt | 85 | 3.08E+13 | 1.46E+14 | Good |

EXAMPLE 5

Processing of PP Injection Molded Plaques

In order to evaluate their processability in PP and surface properties, the compounds of the formula I are incorporated in polypropylene injection molded plaques according to the following procedure:

The polypropylene powder HC115MO and the compounds of formula I are dried in a vacuum oven for eight hours at 80° C. and 40° C. respectively. Appropriate amounts of the compounds of formula I are added to the dried polypropylene powder to obtain formulations containing up to 20% by weight of the compound. The formulations are mixed in a turbo mixer and compounded to pellets in a twin-screw extruder (MiniLab or Polylab from Thermo Electron Corp.) and further injection molded to plaques of a width of 30 mm, length of 40 mm and thickness of 2 mm using a micro-injection molding machine (BabyPlast from CronoPlast) or to larger plaques of a width of 85 mm, length of 90 mm and thickness of 2 mm using an injection molding machine (Arbug 320S). The processing temperature is around 220° C. The results are summarized in Table 5a and 5b.

Example 5a is a comparison example. Examples 5b, 5c, 5d are examples of the present invention describing formulations including the 3 components (a), (b) and (c).

EXAMPLE 6

Processing of HDPE Injection Molded Plaques

In order to evaluate their processability in HDPE and surface properties, the compounds of the formula I are incorporated in high density polyethylene injection molded plaques according to the following procedure:

The high density polyethylene powder BL2571 and the compounds of formula I are dried in a vacuum oven for eight hours at 80° C. and 40° C. respectively. Appropriate amounts of the compounds of formula I are added to the dried polyethylene powder to obtain formulations containing up to 20% by weight of the compounds. The formulations are mixed in a turbo mixer and compounded to pellets in a twin-screw extruder (MiniLab or Polylab from Thermo Electron Corp.) and further injection molded to plaques of a width of 30 mm, length of 40 mm and thickness of 2 mm using an micro-injection molding machine (BabyPlast from CronoPlast). The processing temperature is around 220° C. The results are summarized in Table 6.

Example 6a is a comparison example. Examples 6b to 6e are examples of the present invention describing formulations including the 3 components (a), (b) and (c).

TABLE 5a

Results for PP injection molded small plaques

| Example | Additive | Contact angle [°] | SR [Ohm/sq] @ 50% RH | SR [Ohm/sq] @ 15% RH | Processability/ Compatibility |
|---|---|---|---|---|---|
| 5a | None | 107 | 8.08E+14 | 8.85E+14 | — |
| 5b | 10% 105:NaTS 98:2 | 51 | 3.77E+11 | 6.43E+11 | Good |
| 5c | 20% 105:NaTS 98:2 | 39 | 1.71E+11 | 1.01E+12 | Good |
| 5d | 10% 106:NaTS 98:2 | 96 | 1.52E+14 | | Good |

TABLE 5b

Results for PP injection molded large plaques

| Example | Additive | Contact angle [°] | SR [Ohm/sq] @ 50% RH | SR [Ohm/sq] @ 15% RH | Processability/ Compatibility |
|---|---|---|---|---|---|
| 5e | None | 101 | 4.44E+14 | 6.20E+14 | — |
| 5f | 5%102:AcOK 98:2 | 19 | 1.19E+11 | 5.10E+11 | Good/Yellow |
| 5g | 10%102:AcOK 98:2 | 17 | 3.16E+10 | 1.46E+11 | Good/Yellow |
| 5h comp. | 10% 102 without salt | 22 | 3.28E+11 | 1.02E+12 | Good |
| 5k comp. | 5% 103 without salt | 61.5 | 3.45E+11 | 2.18E+12 | Good |
| 5l | 5% 103:AcOK 98:2 | 53 | 9.86E+10 | 6.67E+11 | Good/Yellow |

TABLE 6

Results for HDPE injection molded small plaques

| Exam. | Additive | Contact angle [°] | SR [Ohm/sq] @ 50% RH | SR [Ohm/sq] @ 30% RH | SR [Ohm/sq] @ 15% RH | Processability/ Compatibility |
|---|---|---|---|---|---|---|
| 6a | None | 100 | 6.67E+14 | 2.95E+14 | 8.08E+14 | — |
| 6b | 10% 105:NaTS 98:2 | 66 | 7.88E+13 | | | Good |
| 6c | 20% 105:NaTS 98:2 | — | 8.85E+13 | | | Good |
| 6d | 10% 106:NaTS 98:2 | 94 | 2.34E+11 | 6.39E+12 | 1.75E+13 | Good |
| 6e | 20% 106:NaTS 98:2 | 82 | 1.51E+10 | 1.57E+11 | 4.33E+11 | Weak |

EXAMPLE 7

Processing of PP Blow Molded Bottles

In order to evaluate their processability in PP and surface properties, the compounds of the formula I are incorporated in polypropylene blow molded bottles according to the following procedure:

The polypropylene powder HC115MO and the compounds of formula I are dried in a vacuum oven for eight hours at 80° C. and 40° C. respectively. Appropriate amounts of the compounds of formula I are added to the dried polypropylene powder to obtain formulations containing up to 20% by weight of the compounds. The formulations are mixed in a turbo mixer and compounded to pellets in a twin-screw extruder (MiniLab or Polylab from Thermo Electron Corp.) and further blow molded to bottles of 50-100 mL (using an LE25-30 extruder and LBM-125 injection molding machine both from Labtech). The processing temperature is around 220° C. The results are summarized in Table 7.

Example 7a is a comparative example. Examples 7b to 7g are examples of the present invention describing formulations including the 3 components (a), (b) and (c). The best examples are 7b to 7e describing the reduction of surface resistivity and good processability and visual compatibility.

TABLE 7

Results for PP blow molded bottles

| Example | Additive | Contact angle [°] | SR [Ohm/sq] @ 50% RH | SR [Ohm/sq] @ 30% RH | Compatibility |
|---|---|---|---|---|---|
| 7a | None | 94 | 1.07E+15 | 5.63E+14 | — |
| 7b | 0.9% 102:0.05% NaTos | — | 3.91E+10 | 4.59E+11 | Good |
| 7c | 1.5% 102:0.1% NaTos | — | 4.45E+10 | 6.46E+10 | Good |
| 7d | 5% 102:0.1% NaTos | 85 | 2.00E+10 | 7.96E+10 | Good |
| 7e | 5% 105:0.1% NaTos | 70 | 9.68E+10 | 5.45E+11 | Good |
| 7f | 5% 106:0.1% NaTos | 86 | 1.70E+15 | 1.00E+15 | Good |
| 7g | 5% 106:0.1% NaMes | — | 8.68E+14 | 9.24E+14 | Good |

EXAMPLE 8

Procedure Used for the Evaluation of the Permanency of the Surface Effect

The permanency of the surface resistivity is evaluated using the following procedure. The sample is dipped in distilled water at defined temperature and time. It is left to dry in ambient air for 24 hours or shorter and immediately measured at 50% relative humidity of the air without conditioning and again after prolonged conditioning at 50% relative humidity of the air. Table 10 summarizes the durability of the surface effect. The samples are PP injection molded plaques of large scale obtained according to the description in example 5.

Example 8a is without antistatic additive. Examples 8b to 8e are examples of the present invention.

The results indicate that there is almost no change observed between the initial value measured after processing and after the water extraction treatment, thus demonstrating the permanency of the additives investigated

TABLE 10

Permanency of the surface effect obtained in polypropylene

| Exam. | Additive (SR [Ohm/sq] @ 50% RH) | Initial value after processing | I | II | III | IV |
|---|---|---|---|---|---|---|
| 8a | none | 4.44E+14 | 4.49E+14 (i) | 3.66E+15 | 6.02E+14 (i) | 2.05E+15 |
| 8b | 5% 102:AcOK 98:2 | 1.19E+11 | 1.44E+11 (i) | 6.55E+10 | 3.56E+11 (i) | 3.41E+11 |
| 8c | 10% 102:AcOK 98:2 | 3.16E+10 | 7.39E+10 (i) | 3.18E+10 | 3.09E+11 (i) | 4.53E+11 |

TABLE 10-continued

Permanency of the surface effect obtained in polypropylene

| Exam. | Additive (SR [Ohm/sq] @ 50% RH) | Initial value after processing | I | II | III | IV |
|---|---|---|---|---|---|---|
| 8d | 5% 102:AcOK 98:2 | 1.19E+11 | 5.51E+11 (ii) | — | 6.83E+11 (ii) | — |
| 8e | 10% 102:AcOK 98:2 | 3.16E+10 | 6.75E+11 (ii) | — | 2.59E+11 (ii) | — |

I After dipping the sample in water at room temperature for 60 minutes and drying in ambient air for (i) 24 hours or (ii) 15 min (no conditioning)
II After subsequent conditioning for 3 days at 50% relative humidity
III After dipping the same sample in water at room temperature for additional 24 hours and drying in ambiant air for (i) 24 hours or (ii) 15 min (no conditioning)
IV After subsequent conditioning for 3 days at 50% relative humidity

The invention claimed is:

1. A composition comprising:
a) a thermoplastic or elastomeric polymeric substrate,
b) an antistatic polymer of formula (I):

$$Q_1\text{-}Q_2 \quad (I)$$

with a molecular weight of at least 400, and
c) an inorganic or organic salt,
wherein $Q_1$ is $C_{20}$-$C_{100}$alkyl, $C_{20}$-$C_{100}$alkykenyl, or $C_5$-$C_{12}$cycloalkyl substituted by from 1 to 5 $C_1$-$C_{100}$alkyl groups;
$Q_2$ is a group of formula (II)

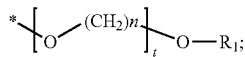

$R_1$ is H or $CH_3$;
n is from 2 to 6;
t is from 1 to 200; and
* is a point of attachment.

2. The composition of claim 1, wherein $Q_1$ is $C_{20}$-$C_{100}$alkyl.

3. The composition of claim 1, wherein $Q_2$ is a group of formula (IIa):

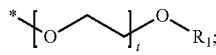

$R_1$ is H or $CH_3$ and
t is from 1 to 50.

4. The composition of claim 1, wherein the inorganic or organic salt is at least one salt selected from the group consisting of $LiClO_4$, $LiCF_3SO_3$, $NaClO_4$, $LiBF_4$, $NaBF_4$, $KBF_4$, $NaCF_3SO_3$, $KClO_4$, $KPF_6$, $KCF_3SO_3$, $KC_4F_9SO_3$, $Ca(ClO_4)_2$, $Ca(PF_6)_2$, $Mg(ClO_4)_2$, $Mg(CF_3SO_3)_2$, $Zn(ClO_4)_2$, $Zn(PF_6)_2$, $Ca(CF_3SO_3)_2$, an Na or K salt of phosphoric acid, an Na or K salt of a $C_1$-$C_{18}$carboxylic acid, and an Na or K salt of an aromatic or aliphatic sulfonic acid.

5. The composition of claim 4, wherein the inorganic or organic salt is an $Na^+$ or $K^+$ salt of $CH_3SO_3^-$, $CF_3SO_3^-$ or

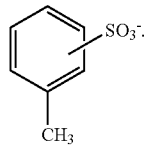

6. The composition of claim 1, wherein the thermoplastic or elastomeric polymeric substrate is a polyolefin, a polystyrene, a copolymer of acrylonitrile/butadiene/styrene (ABS), a polymer of an α,β-unsaturated acid, a halogen-containing polymer, a homo- or co-polymer of a cyclic ether, a polymer of an unsaturated alcohol or amine or both, a polyacetal, a polyphenylene oxide, a polyurethane, a polyamide, a polyester, a polyurea, a polycarbonate, a polysulfone, or natural rubber.

7. The composition of claim 6, wherein the thermoplastic or elastomeric polymeric substrate is a polyolefin, a polystyrene, a copolymer of acrylonitrile/butadiene/styrene (ABS), a polymer of an α,β-unsaturated acid, a halogen-containing polymer, or a homo- or co-polymer of a cyclic ether.

8. The composition to of claim 7, wherein the thermoplastic or elastomeric polymeric substrate is polyvinyl chloride (PVC), polyethylene, polystyrene, or polypropylene.

9. The composition of claim 1, wherein a content of the antistatic polymer of formula (I) is from 0.1% to 30% by weight, based on a weight of the thermoplastic or elastomeric polymeric substrate.

10. The composition of claim 1, wherein a content of the inorganic or organic salt is from 0.1% to 10% by weight, based on a weight of the thermoplastic or elastomeric polymeric substrate.

11. The composition of claim 1, further comprising at least one additive selected from the group consisting of a UV absorber, a sterically hindered amine, a phenolic antioxidant, a phosphite, a phosphonite, a benzofuranone, and an indolinone.

12. A process for preparing an antistatic thermoplastic or elastomeric polymeric article, comprising:
incorporating the composition of claim 1 into a thermoplastic or elastomeric polymeric substrate.

13. An antistatic additive, comprising a polymer of formula (I):

$$Q_1\text{-}Q_2 \quad (I)$$

with a molecular weight of at least 400,
wherein $Q_1$ is $C_{20}$-$C_{100}$alkyl, $C_{20}$-$C_{100}$alkenyl, or $C_5$-$C_{12}$cycloalkyl substituted by from 1 to 5 $C_1$-$C_{100}$alkyl groups;
$Q_2$ is a group of formula (II):

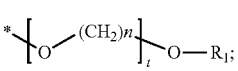

$R_1$ is H or $CH_3$;
n is from 2 to 6;
t is from 1 to 200; and
* is a point of attachment.

14. The additive of claim 13, further comprising an organic or inorganic salt.

15. The composition of claim 3, wherein t is from 2 to 20.

16. The composition of claim 1, wherein the molecular weight of the antistatic polymer of formula (I) is from 500 to 1600.

17. The composition of claim 4, wherein the inorganic or organic salt is NaClO$_4$, Zn(ClO$_4$)$_2$, or NaBF$_4$.

18. The composition of claim 11, wherein the additive is tris(2,4-di-tert-butylphenyl) phosphite, tris(no-nylphenyl) phosphite,

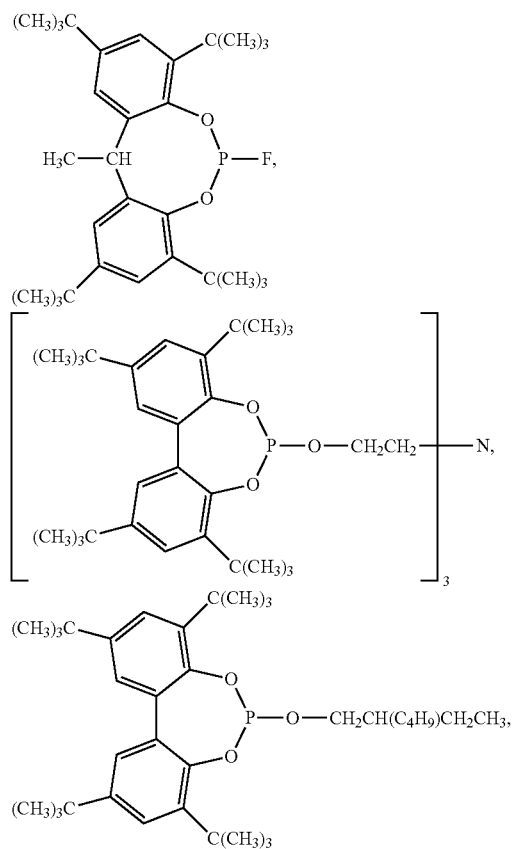

19. The additive of claim 13, wherein Q$_1$ is C$_{20}$-C$_{100}$alkyl.

20. The additive of claim 13, wherein Q$_2$ is a group of formula (IIa):

$$\ast\!\!-\!\!\left[\mathrm{O}\diagup\diagdown\right]_t\!\!\!\mathrm{O}\!\!-\!\!\mathrm{R}_1; \qquad\qquad (\mathrm{IIa})$$

R$_1$ is H or CH$_3$ and
t is from 1 to 50.

* * * * *